Patented Jan. 29, 1946

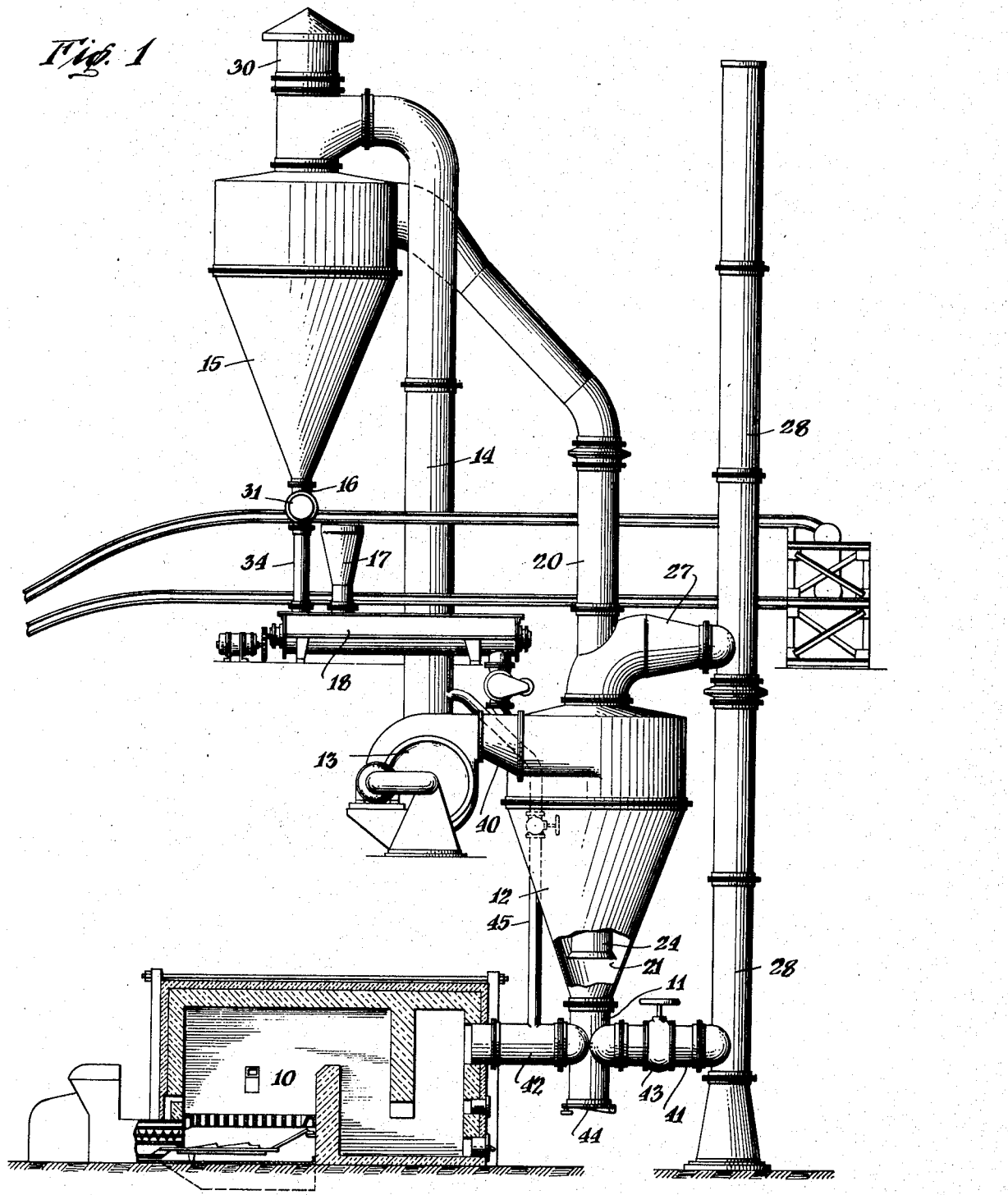

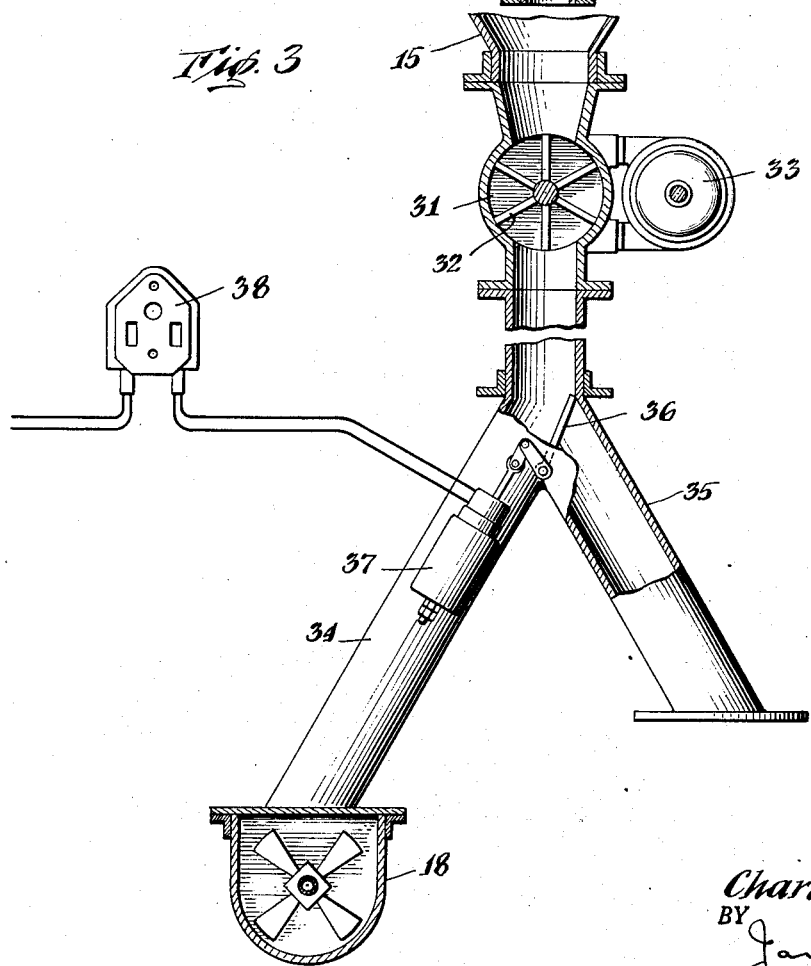

2,393,766

UNITED STATES PATENT OFFICE 2,393,766

DRYING APPARATUS

Charles W. Gordon, Glen Ellyn, Ill., assignor to Combustion Engineering Company, Inc., New York, N. Y.

Application November 28, 1942, Serial No. 467,167

4 Claims. (Cl. 34—57)

This invention relates to improvements in material drying apparatus and is particularly applicable to drying the finer sizes of material such as coal from a mine. Such coal may carry moisture with it, sufficient in quantity to require removal before the coal may be used satisfactorily.

My co-pending application Serial No. 316,205, filed January 29, 1940, now Patent No. 2,296,159, dated September 15, 1942, describes apparatus which is satisfactory for drying many such materials but which does not always give adequate results where greater drying is necessary and a minimum of dust loss is desired. To accomplish a more adequate drying and dust removal, I employ the drying apparatus disclosed in said application utilizing the principle of drying the material while suspended in a current of hot gas, except that I add a second cyclone separator connected in series with respect to the gas flow. The wet material to be dried is delivered into this second separator. By this arrangement the cooled moist gas from the first collector dries the entering cold, wet material, and the hot gas from the furnace dries the hotter drier material, thereby employing the counter-flow principle of heat exchange and drying. A novel design for the second collector offers improvements in the operation of the apparatus.

In the drawings:

Figure 1 is a diagrammatic elevational view of the improved drying apparatus;

Figure 2 is a sectional elevation through the improved cyclone collector;

Figure 3 is an enlarged sectional view of part of the apparatus shown in Figure 1.

In general the drying apparatus comprises a furnace 10 delivering hot gas through a conduit 20 to a cyclone 15 for separating the dried material from the hot gas. A conduit 14 leads from the separator 15 for conveying the moist cooled gases to a fan 13 that creates an upward draft through a conduit 20. Another separator or cyclone 12 receives the moist cooled gases from fan 13 and some of the dried material passing from collector 15 through a conduit 16 to mix with the wet material entering the system in desired amounts at 17, a mixer 18 mixes the dried material and wet material and delivers the mixture to the cyclone 12.

The vertical conduit 20 passes centrally downwardly into the collector 12 as shown in Figure 2, terminating short of the bottom of the collector and leaving a free annular space 21 between its lower edge and the sides of the collector. The bottom opening 22 of conduit 20 is aligned with the discharge end of conduit 11 (Figure 1) and is spaced therefrom. As shown in Figure 2, the lower end portion of conduit 20 is provided with a vertically adjustable sleeve 24 so that the annular space 21 around the lower end of conduit 20 may be varied. The bottom of sleeve 24 may be flared. At the top of collector 12 and concentrically surrounding conduit 20 a conduit 26 extends downwardly for a certain distance into the collector and forms the gas offtake for the collector 12 leading via duct 27 to stack 28.

The cyclone 15 is of the usual well known type and separates the dried material from the hot moist gas, the material being deposited in the lower end of the collector while the moist gases escape through from the upper end into conduit 14 to the fan 13. A normally closed relief valve 30 surmounts collector 15 and automatically relieves any excess pressure in the apparatus. An air seal valve 31, Figure 3, attached to the lower end of collector 15 is provided with blades 32 rotatable by motor 33 so that the separated dried material from the collector 15 is delivered through the valve while excluding air.

Below valve 31 two diverging conduits 34, 35 lead respectively to the mixer 18 and to a point of delivery. A damper 36 is positioned at the point of divergence and is movable to completely close either conduit 34 or conduit 35. This movement is controlled by a solenoid 37 operated at timed intervals by a timer 38 which is adjustable to any desired time intervals of operation.

The mixer 18, Figure 1, receives wet material from hopper 17 and dry material from conduit 16 discharging both into a duct 40 between fan 13 and separator 12.

The stack 28 receives the moisture laden air leaving cyclone 12 through conduit 27. The lower end of stack 28 connects via conduit 41 into both conduits 11 and the furnace offtake 42. A valve 43 controls the flow through conduit 41. A cleanout door 44 permits the removal of any deposit at the bottom of conduit 11. Optionally a valved by-pass conduit 45 may be connected between conduit 42 and the duct 14 leading to fan 13 for adding hot gas to the moist gas entering collector 12.

In operation wet material is transported to hopper 17 which feeds it into mixer 18 while dry material is fed to the latter in predetermined proportion through conduit 34. The dry and wet materials are then mixed while being advanced and the mixture is discharged into conduit 40. Fan 13 delivers a current of warm moist gases from cyclone 15 into conduit 40 to convey the mixture in suspension into cyclone collector 12 wherein the material is partially dried and effectively separated from the gases because of the relatively wet state of the material. The separated wet gases pass out through conduit 26 to stack 28 and the separated moist material descends through annular passage 21 into conduit 11 where it is lifted by the ascending hot gas stream and carried therewith in flotation up through conduit 20 while being dried by the hot gases. From conduit 20 the material-gas mixture is delivered into cyclone 15 where it is finally dried and separated; the moist gas leaving collector 15 via conduit 14 to enter fan 13 and the dry material descending into and through seal valve 31 whence a portion passes via conduit 34 to mixer 18.

The adjustable sleeve 24 (Figure 2) on the bottom of conduit 20 within collector 12 controls the pressure at the annular passage 21 so that preferably there will be a minimum by-passing of wet gases therethrough into conduit 20 while providing a free passage for the moist material. The material is carried out of collector 12 concentrated in a small portion of gases, which adds to the efficiency of separation.

I have found that it is generally possible to operate the counter-flow system as shown without undue difficulties from condensation in the wet collector 12. To give added flexibility, I may in some cases include the by-pass conduit 45 between conduits 42 and 14 through which a relatively small quantity of hot gases may be added to the collector 12 thereby raising the temperature therein and overcoming any condensation. This may be necessary when the material being dried shows a tendency to adhere to the sides of the collector in a moist state, which might eventually cause plugging. By my arrangement of placing a portion of the hot duct 20 within collector 12 the radiation therefrom will in most cases be sufficient to prevent any excessive condensation within collector 12; nor will the radiated heat be excessive and overheat the gases discharged through duct 27 since the drop in temperature within conduit 20 due to evaporation will be very rapid and its metal temperature will not be excessive.

What I claim is:

1. In a drying system; a source of hot gases; two cyclone collectors through which the gases and the material being dried flow in series; a first conduit connecting the gas outlet of the second collector to the gas and material inlet of the first collector; means delivering wet material into said conduit; a second conduit connected to the gas and material inlet of the second collector and projecting concentrically from the interior of said first collector and having its inner end open to the interior of the latter with the edges of the open end of the conduit symmetrically spaced from the walls of said collector; a third conduit connected to said first collector in concentric alignment with and spaced from the open end of said second conduit and connected also to said source of hot gases; means for causing gas flow through said third conduit into said first collector for picking up material passing between said second conduit and the surrounding walls of said first collector and carrying it into and through said second conduit into said second collector, the separated gas passing thence through the first conduit into the first collector; and a vent outlet for the system from the first collector.

2. A material drier and separator of the cyclone type comprising a casing provided at one end with a tangential inlet in its side wall for introducing gas and wet material entrained therein and formed with a centrally located outlet for separated gases in its end wall at said one end; means for delivering wet material and relatively cool gas at high velocity to the inlet of said casing; a first conduit constituting the only outlet for the separated material extending into said casing and terminating short of the opposite end of said casing with its inner end open to the interior thereof and symmetrically spaced from the casing walls; means for supplying a stream of relatively hot drying gas at high velocity; a second conduit leading from said supply means and connected to said casing substantially in registration with the inner end of said first conduit for supplying said relatively hot gas to pick up all of the separated material that passes between said first conduit and the surrounding walls of said casing toward said second conduit for carrying all said separated material in suspension in all of said hot gas into and through said first conduit to be dried therein in passing out of said drier.

3. A material drier and separator of the cyclone type comprising a casing provided at one end with a tangential inlet in its side wall for introducing relatively cool gas and wet material entrained therein and formed with a centrally located outlet for separated gases in its end wall at said one end; means for delivering wet material and relatively cool gas at high velocity to the inlet of said casing; a centrally located opening at the opposite end of said casing; a first conduit constituting the only outlet for all of the separated material extending into said casing with its inner end open to the interior thereof and symmetrically spaced from the casing walls in concentric relation to and facing said opening; a second conduit for supplying gas through said opening connected to said casing in alinement with said first conduit; and means for supplying relatively hot dry gas through said second conduit into said casing at high velocity for picking up all of the separated material that passes between said first conduit and the surrounding walls of said casing toward said opening for carrying all said separated material in suspension in all of said hot gas and a small portion of the relatively cool gas into and through said first conduit to be dried therein in passing out of said drier.

4. A material drier and separator of the cyclone type comprising a casing provided at one end with a tangential inlet in its side wall for introducing relatively cool gas and wet material entrained therein and formed with a centrally located outlet for relatively cool separated gases in its end wall at said one end; means for delivering wet material and relatively cool gas at high velocity to the inlet of said casing; a centrally located opening at the opposite end of said casing; a first conduit constituting the only outlet for all of the separated material extending into said casing with its inner end open to the interior thereof and symmetrically spaced from the casing walls in concentric relation to and facing said opening; a second conduit for supplying gas through said opening connected to said casing in registration with said first conduit; and means connected to said second conduit for supplying at high velocity relatively hot gas substantially equal in amount to the discharged relatively cool gas through said second conduit into said casing for picking up all of the separated material that passes between said first conduit and the surrounding walls of said casing toward said opening and carrying all said separated material in suspension in all of the hot gas into and through said first conduit out of said drier.

CHARLES W. GORDON.